(12) United States Patent
Nakagawa et al.

(10) Patent No.: US 8,926,878 B2
(45) Date of Patent: Jan. 6, 2015

(54) GOLF BALL AND METHOD FOR MANUFACTURING THE SAME

(75) Inventors: Takuma Nakagawa, Chichibu (JP); Katsunori Sato, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 276 days.

(21) Appl. No.: 12/789,814

(22) Filed: May 28, 2010

(65) Prior Publication Data

US 2010/0317464 A1 Dec. 16, 2010

Related U.S. Application Data

(63) Continuation-in-part of application No. 12/483,596, filed on Jun. 12, 2009.

(51) Int. Cl.
| | |
|---|---|
| *B29C 45/16* | (2006.01) |
| *A63B 45/00* | (2006.01) |
| *A63B 37/00* | (2006.01) |
| *A63B 43/00* | (2006.01) |
| *A63B 45/02* | (2006.01) |
| *B29C 45/00* | (2006.01) |
| *B29C 45/37* | (2006.01) |
| *B29L 31/54* | (2006.01) |

(52) U.S. Cl.
CPC .............. *A63B 45/00* (2013.01); *A63B 37/0003* (2013.01); *A63B 43/008* (2013.01); *A63B 45/02* (2013.01); *B29C 45/0025* (2013.01); *B29C 45/372* (2013.01); *A63B 37/0022* (2013.01); *B29C 2045/0034* (2013.01); *B29L 2031/545* (2013.01)
USPC ............................ 264/161; 264/129; 264/162

(58) Field of Classification Search
CPC .................. B29C 2045/0034; B29L 2031/546
USPC .................... 264/161, 297.2, 129, 162, 328.9
See application file for complete search history.

(56) References Cited

U.S. PATENT DOCUMENTS 2,787,024 A * 4/1957 Smith .......................... 264/275
5,407,341 A 4/1995 Endo et al.
(Continued)

FOREIGN PATENT DOCUMENTS

| JP | 53-129460 U | 10/1978 |
|---|---|---|
| JP | 60-27945 U | 2/1985 |

(Continued)

OTHER PUBLICATIONS

Japanese Office Action issued in Japanese Application No. 2010-133764 dated Sep. 18, 2013.

(Continued)

*Primary Examiner* — Joseph S Del Sole
*Assistant Examiner* — Kimberly A Stewart
(74) *Attorney, Agent, or Firm* — Sughrue Mion, PLLC

(57) ABSTRACT

A method for manufacturing a golf ball includes the steps of forming the golf ball by using a mold, which mold includes at least two body parts, and is configured so that a cavity is formed within the mold by the joining of the at least two body parts, and in at least one of the body parts, a groove for forming a projecting land part which is ground after the formation of the golf ball is provided in a cavity wall surface near the entire circumference of a parting line formed by the joining; and performing treatment in which the golf ball formed by using the mold is treated so that the color of the entire land part of the golf ball is different from the color of dimples.

5 Claims, 5 Drawing Sheets

(56) References Cited

U.S. PATENT DOCUMENTS

| | | | |
|---|---|---|---|
| 5,494,631 A * | 2/1996 | Oka et al. | 264/161 |
| 6,428,299 B1 | 8/2002 | Tanaka et al. | |
| 6,685,455 B2 * | 2/2004 | Ogg | 425/116 |
| 6,981,927 B2 | 1/2006 | Aoyama | |
| 2004/0087389 A1 | 5/2004 | Kasashima et al. | |
| 2004/0248668 A1 | 12/2004 | Aoyama | |

FOREIGN PATENT DOCUMENTS

| | | | |
|---|---|---|---|
| JP | 60-34469 A | | 2/1985 |
| JP | 5-111550 A | | 5/1993 |
| JP | 6-46926 U | | 6/1994 |
| JP | 07-051405 A | | 2/1995 |
| JP | H07-051405 | * | 2/1995 |
| JP | 11-114092 A | | 4/1999 |
| JP | 2007-268265 A | | 10/2007 |
| JP | 2009-95668 A | | 5/2009 |

OTHER PUBLICATIONS

Japanese Office Action, dated Apr. 4, 2014, issued in corresponding Japanese Patent Application No. 2010-133764.

* cited by examiner

GOLF BALL AND METHOD FOR MANUFACTURING THE SAME

CROSS-REFERENCE TO RELATED APPLICATIONS

This application is related to "Mold for Forming Golf Ball and Golf Ball Manufactured Using the Same" by Takuma NAKAGAWA and Katsunori SATO of presently pending U.S. patent application Ser. No. 12/483,596 filed on Jun. 12, 2009.

BACKGROUND OF THE INVENTION

The present invention relates to a golf ball having different colors in an inner part of a dimple and the land part thereof, and relates to a method for manufacturing the golf ball.

Japanese Patent Application Publication No. 60-34469 and Japanese Patent Application Publication No. 05-111550 describe a method for manufacturing a golf ball having different colors in an inner part of a dimple and the land part thereof, in which method, after the entire surface of the golf ball has been colored by painting, the surface of the land part is ground to remove the paint on the land part.

Usually, a golf ball is formed by using a forming mold capable of being divided into two pieces, which mold has a spherical cavity therein, is formed with a large number of protrusions for forming dimples (dimple forming protrusions) on the wall surface of the cavity, and has a parting line substantially at the position of the equator of the cavity. On the parting line, gates for injecting a cover material for the golf ball are provided at equal intervals on the circumference. Therefore, for the golf ball formed by using such a mold, burrs are produced on the parting line. The burrs are removed by grinding the surface of the golf ball after the golf ball has been formed by using the mold.

Japanese Patent Application Publication No. 60-34469 describes a method in which the golf ball is color painted after being formed by using the mold and before burrs are removed. In this method, unfortunately, unpainted portions and unevenly painted portions are produced by the influence of burrs. Therefore, this method has a problem of difficulty in evenly color painting the entirety of the golf ball.

Japanese Patent Application Publication No. 05-111550 describes a method in which the golf ball is color painted after the burrs have been removed by grinding. In this method, unfortunately, when the burrs on the parting line are removed by grinding, the surface of the golf ball cannot be ground uniformly due to the burrs. In particular, land part portions at the edges of dimples near the parting line are undesirably ground at the same time. Therefore, even if the entirety of the golf ball is thereafter color painted and the surface of the land part is ground, it is difficult to remove the paint in the land part portion, which has been scraped off by the grinding of burrs, thoroughly by grinding because the land part portion having been scraped off by the grinding of burrs is lower than other land parts, which poses a problem that the dimple color remains in some of land parts.

Japanese Patent Application Publication No. 11-114092 describes a method in which protrusions are formed in the land parts at both ends of the dimple along the parting line, whereby, when the burrs on the parting line are ground, the surface of the golf ball can be ground uniformly by the plurality of protrusions, so that excessive grinding of the land part portion at the edge of the dimple is avoided.

SUMMARY OF THE INVENTION

Accordingly, an object of the present invention is to provide a golf ball having thoroughly different colors in the dimple and the land part thereof even if the entire surface of the golf ball is color painted after burrs on a parting line have been removed by grinding, and a method for manufacturing the said golf ball.

To achieve the above object, the present invention provides a method for manufacturing a golf ball including the steps of forming the golf ball by using a mold, which mold includes at least two body parts, and is configured so that a cavity is formed within the mold by the joining of the at least two body parts, and in at least one of the body parts, a groove for forming a projecting land part which is ground after the formation of the golf ball is provided in a cavity wall surface near the entire circumference of a parting line formed by the joining; and performing treatment in which the golf ball formed by using the mold is treated so that the color of the entire land part of the golf ball is different from the color of dimples.

The step of performing treatment in which the golf ball formed by using the mold is treated can include the steps of grinding a parting line part of the golf ball formed by using the mold; performing first spherical surface grinding to grind the entire spherical surface of the golf ball the parting line part of which has been ground; color painting the entirety of the golf ball having been subjected to the first spherical surface grinding; and performing second spherical surface grinding to grind the entire spherical surface of the golf ball having been color painted.

A groove in the mold can have a depth of about 5 μm to about 100 μm from an imaginary spherical surface of the cavity. The bottom surface of the groove in the mold and the wall surface of the cavity are preferably connected gradually to each other. The width of the groove in the mold can be within about 10 mm. The bottom surface of the groove in the mold can include a spherical surface portion having the same center with respect to the spherical surface shape of the wall surface of the cavity.

As another mode, the present invention provides a golf ball that is obtained by the above-described method for manufacturing a golf ball.

DETAILED DESCRIPTION OF THE PREFERRED EMBODIMENT

Embodiments of a golf ball and a method for manufacturing the golf ball in accordance with the present invention will now be described in detail with reference to the accompanying drawings. In the embodiment described below, an example in which a golf ball is manufactured by an injection molding process is explained; however, the method in accordance with the present invention is not limited to the injection molding process.

Figure 1:
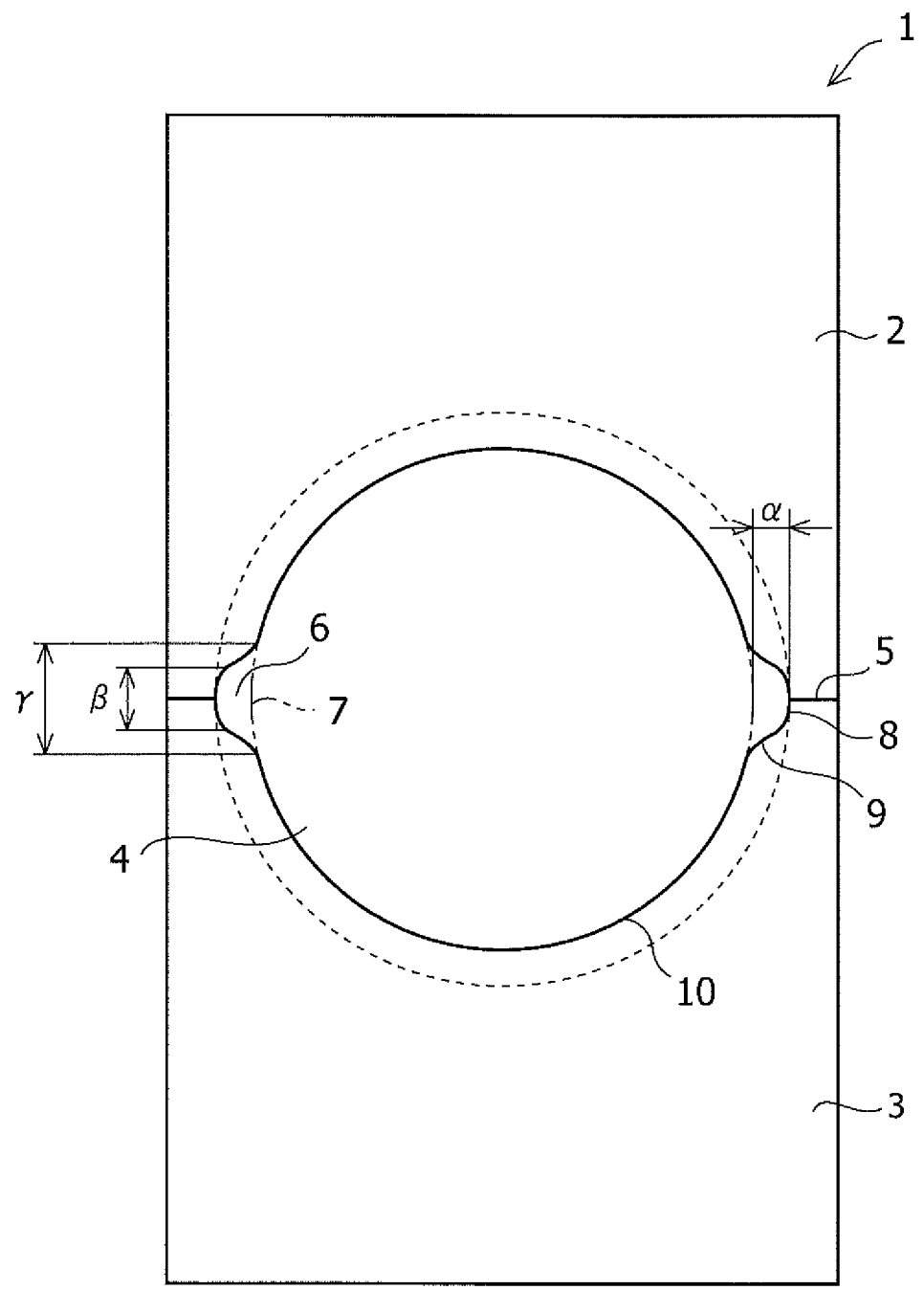
FIG. 1 is a sectional view showing one example of a mold used for a method for manufacturing a golf ball in accordance with the present invention.

According to this embodiment, in order to form a golf ball by the injection molding process, as shown in FIG. 1, a mold 1 for injection molding is used. The mold 1 includes a body part 2 of a metallic upper mold and a body part 3 of a metallic lower mold. By separatably joining the body parts 2 and 3 of the upper and lower molds together, an internal cavity 4 is formed.

The body parts 2 and 3 of the mold 1 each have a groove 6 in a cavity wall surface 10 adjacent to a parting line 5 between the body parts. This groove 6 is a groove for forming a projecting land part for grinding that further projects from the land part of a golf ball on the equator surface of a formed golf ball. The groove 6 is formed in both of the body parts 2 and 3 of the upper and lower molds. In FIG. 1, protrusions for forming dimples are omitted for ease of understanding. Also, a runner, gate, support pin, vent pin, and the like arranged around the cavity are omitted. The kind, number, and arrangement of these elements can be chosen in the same way as the conventional mold.

The projecting land part for grinding formed in a region near the equator of an injection molded golf ball is designed so as to be higher than the land part of the golf ball in regions other than the region near the equator. Therefore, the groove 6 provided in the body parts 2 and 3 of the forming mold 1 has a depth α from an imaginary spherical surface 7 of the internal cavity. Although the depth α is changed depending on the grinding conditions, the upper limit of the depth α is preferably about 100 μm, further preferably about 80 μm, and still further preferably about 60 μm. Also, the lower limit of the depth α is preferably about 5 μm, and further preferably about 10 μm. If the depth α exceeds about 100 μm, grinding work takes much time, and also a golf ball having a low degree of sphericity may be formed. On the other hand, if the depth α is smaller than about 5 μm, the dimple shape may be deteriorated by grinding.

A connecting surface 9 between a groove bottom surface 8 and the cavity wall surface 10 of the body parts 2 and 3 preferably connects these two surfaces to each other gradually. The phrase "connect gradually" means that curves are connected smoothly to each other so as to approach the asymptotic line gradually. That is to say, the groove bottom surface 8 and the cavity wall surface 10 of the body parts 2 and 3 are connected to each other by the connecting surface 9 having a smooth curved shape. As a result, the projecting land part for grinding of an injection molded golf ball is connected smoothly to the land part of the golf ball. Therefore, when grinding is performed after injection molding, a change in grinding force can be accommodated properly.

The groove bottom surface 8 preferably has a width β such that a preferred projecting land part for grinding is formed. Although the width β of the groove bottom surface 8 is changed depending on the grinding conditions, the upper limit of the width β is preferably about 10 mm, further preferably about 8 mm, and still further preferably about 7 mm. Also, the lower limit of the width β is preferably about 0.2 mm, further preferably about 0.4 mm.

The opening of the groove 6 also preferably has a width γ such that a preferred projecting land part for grinding is formed. Although the width γ of the groove 6 is changed depending on the grinding conditions, the upper limit of the width γ is preferably about 10 mm, further preferably about 8 mm, and still further preferably about 7 mm. Also, the lower limit of the width γ is preferably about 0.2 mm, further preferably about 0.4 mm, and still further preferably about 1 mm. If the width γ of the groove 6 exceeds about 10 mm, the grinding area becomes too large, so that the grinding process takes much time, and also the symmetry of a golf ball may be marred. On the other hand, if the width γ of the groove 6 is narrower than 0.2 mm, deformation of dimple shape due to grinding cannot be prevented.

The groove bottom surface 8 of the body parts 2 and 3 is preferably of a shape having a spherical surface portion having the same center as the center of the imaginary spherical surface 7 of the golf ball. Thereby, the vertex surface of the projecting land part for grinding of an injection molded golf ball is shaped into a spherical surface having the same center as the center of the spherical surface of the land part of the golf ball, so that uniform grinding can be performed.

Figure 2:
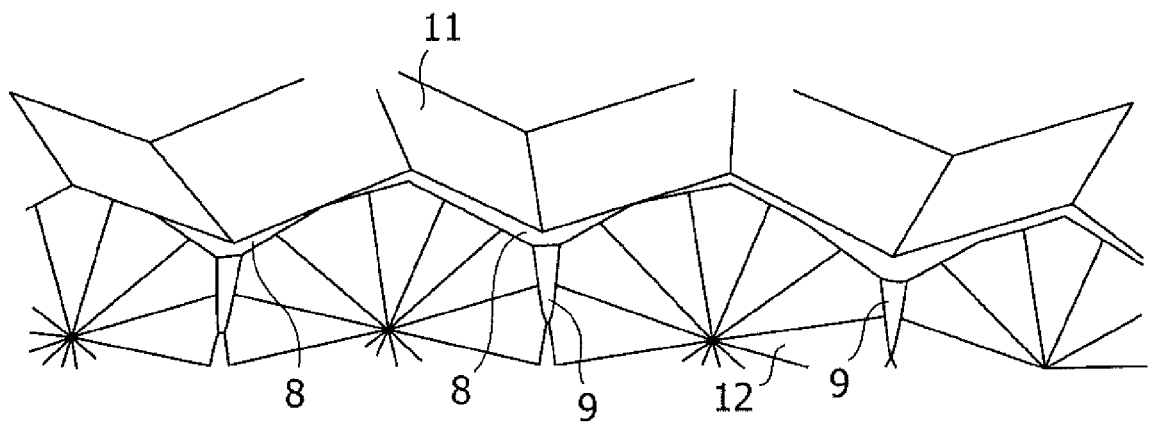
FIG. 2 is an enlarged perspective view showing a portion near a parting line of a body part of a lower mold of the mold shown in FIG. 1.

FIG. 2 is an enlarged perspective view of the cavity wall surface 10 near the parting line in the body part 3 of the lower mold of the mold 1. FIG. 2 shows protrusions 12 for forming noncircular dimples as an example. However, clearly, the present invention can be applied to circular dimples. Also, FIG. 2 shows a case in which the parting line is a zigzag line. However, clearly, the parting line can be made linear or wavy. As shown in FIG. 2, a joint surface 11 to the body part of the upper mold is adjacent to the groove bottom surface 8 for forming the vertex surface of the projecting land part for grinding. The groove bottom surface 8 is adjacent to the connecting surface 9 or the projection 12 for forming the dimple. In the case in which the dimples are arranged so as to straddle the equator surface of the golf ball, the protrusion 12 for forming the dimple is adjacent to the joint surface 11 directly without the groove bottom surface 8 being interposed.

The golf ball is injection molded by using this mold 1. After a core (not shown) of the golf ball has been placed between the body parts 2 and 3 of the upper and lower molds, these body parts 2 and 3 are joined to each other to form the internal cavity 4. Then, a cover material is injected into the cavity 4. The cover material flows in a gap part between the core and the cavity wall surface 10 so that the entire surface of the core is covered with the cover material.

The cover material is not subject to any special restriction if it has a color that is the same as the color of the land part of the golf ball. As the cover material, a thermoplastic resin mainly containing ionomer resin or urethane resin or a thermoplastic elastomer can be used. The color of the cover material is not subject to any special restriction if it is different from the color of a paint, described later. The color of the cover material can be chosen from, for example, white, black, red, blue, yellow, green, purple, orange, and brown. The number of layers of a cover placed on the core is not limited to one, and the cover can be formed into a multilayer construction of two or more layers. The thickness of cover (per one layer) is selected as appropriate depending on the diameter of core and the number of cover layers. However, the lower limit of cover thickness is preferably about 0.5 mm, and the upper limit thereof is preferably about 3.0 mm.

The core is also not subject to any special restriction, and various cores can be used such as a single-layer solid core, a solid core having a plurality of vulcanized rubber layers, a solid core having a plurality of resin layers, and a thread-wound core having a thread rubber layer.

Figure 3A:
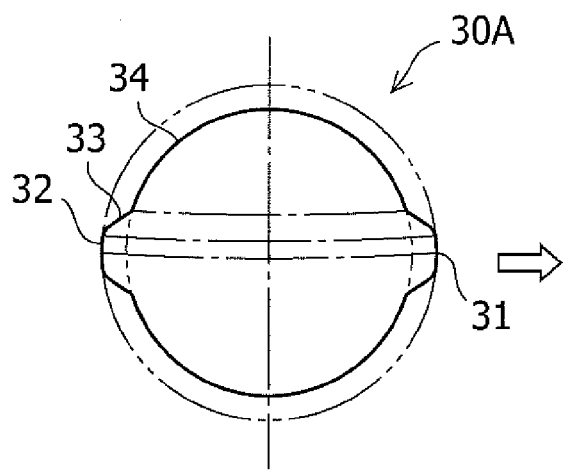
FIG. 3(A) is a schematic view of a golf ball formed by the mold shown in FIG. 1.

FIG. 3(A) shows a golf ball injection molded by using the mold 1. As shown in FIG. 3(A), a golf ball 30A has a projecting land part 32 for grinding around an equator 31 thereof. For ease of understanding, the illustration of dimples is omitted in FIG. 3(A). The vertex surface of the projecting land part 32 and a land part 34 of the golf ball are connected to each other by a connecting land part 33. The connecting land part 33 preferably has a shape so as to be smoothly continuous with the land part 34. The projecting land part 32 for grinding has the vertex surface of a spherical surface having the same center as the center of the spherical surface of the golf ball land part 34.

Figure 3B:
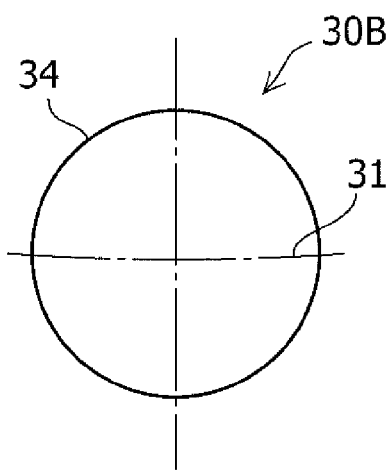
FIG. 3(B) is a schematic view of a golf ball obtained by subjecting the golf ball shown in FIG. 3(A) to grinding for trimming.

Next, the golf ball formed by using the mold 1 is ground to remove burrs produced near the equator (in this specification, referred to as "grinding for trimming"). FIG. 3(B) is a schematic view showing a state after the golf ball shown in FIG. 3(A) has been ground. As shown in FIG. 3(B), by the grinding for trimming, the projecting land part 32 for grinding formed on the equator 31 of the golf ball is scraped off. Thus, a golf ball 30B that is a spherical body overall can be obtained. Hereunder, the grinding for trimming and the maintenance of dimple shape are explained in detail.

Figure 4:
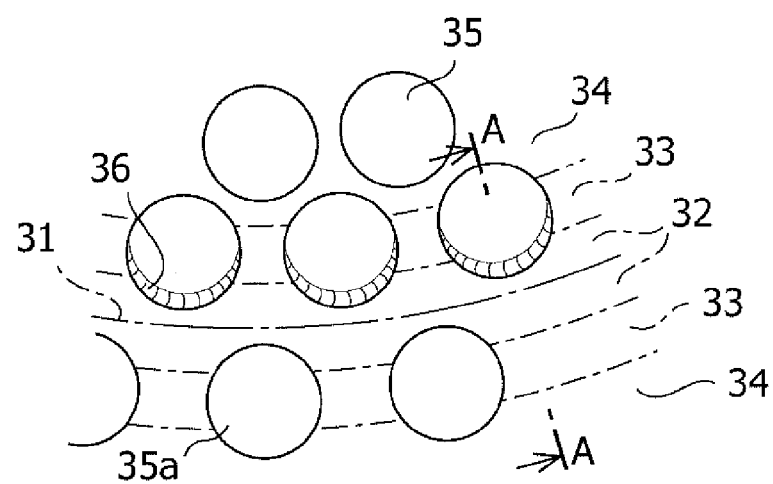
FIG. 4 is a perspective view showing the vicinity of the equator of a golf ball at the stage of forming by using a mold in a method for manufacturing the golf ball in accordance with the present invention.
Figure 5A:
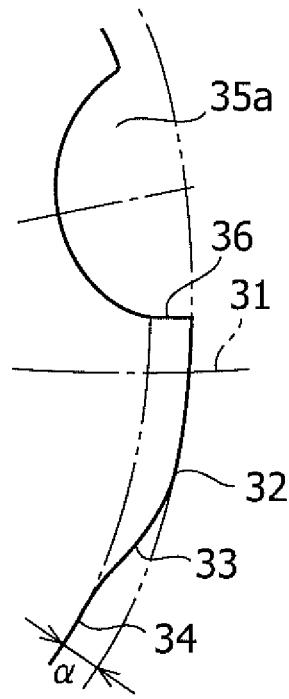
FIG. 5(A) is a sectional view of the vicinity of the equator of a golf ball taken along the line A-A of FIG. 4.

FIG. 4 is an enlarged view of a region near the equator of the golf ball 30A before the grinding for trimming. This figure is an enlarged view of the golf ball formed with circular dimples. FIG. 5(A) is a sectional view taken along the line A-A of FIG. 4. As shown in FIGS. 4 and 5(A), plural dimples 35 are formed in the surface of the golf ball. Around the equator 31, the projecting land part 32 for grinding having a width in the direction of upper and lower poles is formed excluding the regions of the dimples 35. Dimples 35a adjacent to the equator 31 each have a predetermined depth from the land part 34 like other dimples 35. Furthermore, at the edge adjoining the projecting land part 32 for grinding of the dimple 35a, a cliff 36 having a height a of the projecting land part for grinding is formed. This height α is the height of the projecting land part 32 for grinding relative to the land part 34. The projecting land part 32 for grinding is continuous with the land part 34 via the connecting land part 33.

Figure 5B:
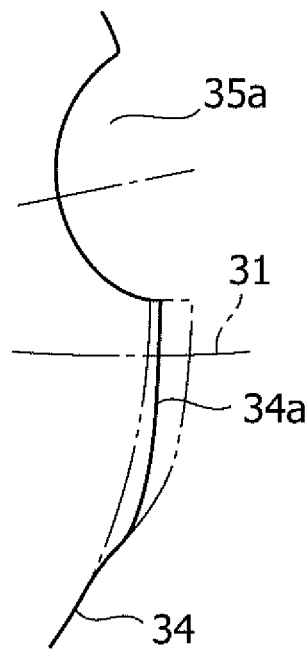
FIG. 5(B) is a sectional view showing a state after the golf ball shown in FIG. 5(A) has been ground for trimming.

FIG. 5(B) is a sectional view showing a state after the golf ball shown in FIG. 5(A) has been ground for trimming. As shown in FIG. 5(B), the projecting land part 32 for grinding having been formed near the equator 31 of the golf ball is scraped off by the grinding for trimming. However, since the projecting land part 32 for grinding is not ground beyond the height α, the land part 34a near the equator 31 can be prevented from being scraped off deeper than the land part 34 in other regions.

By preventing the land part 34a near the equator 31 from being scraped off excessively as described above, the dimples 35a present near the equator 31 can also be prevented from being deformed in shape or being shallow in depth. By maintaining a predetermined shape and depth of the dimple, the inherent aerodynamic performance of the golf ball can be achieved. Also, thereby, the adjustment width of symmetry of dimples arranged on the golf ball surface can be widened.

Even if the scraped height somewhat varies depending on the force of grinding for trimming, the ball surface after grinding can maintain the spherical shape because the connecting land part 33 connects smoothly with the land part 34. Also, at the time of spherical surface grinding, described later, of the entirety of the golf ball, the golf ball can be ground uniformly.

Figure 6A:
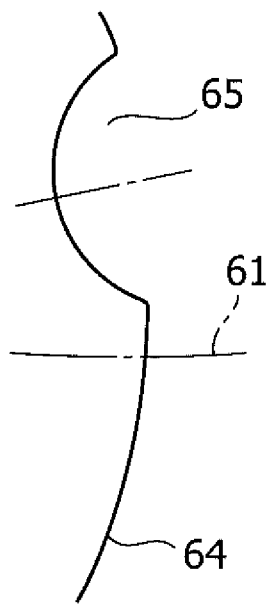
FIG. 6(A) is a sectional view showing the vicinity of the equator of a golf ball formed by using a conventional mold.
Figure 6B:
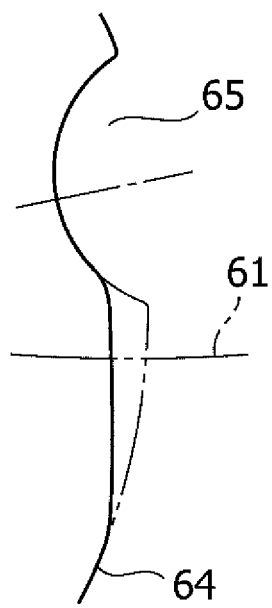
FIG. 6(B) is a sectional view showing a state after the golf ball shown in FIG. 6(A) has been ground.

For comparison, FIG. 6(A) shows a region near the equator of the golf ball formed by using a conventional golf ball forming mold. As shown in FIG. 6(A), near an equator 61 of a golf ball having been injection molded by using the conventional mold, a land part 64 that is the same as that of other regions is formed. Therefore, when this golf ball is ground to remove burrs produced at the equator, as shown in FIG. 6(B), the vicinity of the equator 61 is scraped off excessively as compared with other regions. Therefore, the shape of the dimple present near the equator 61 of the golf ball cannot maintain the inherent shape and is deformed greatly.

In this embodiment, after the above-described grinding for trimming, the entire spherical surface of the golf ball is ground (in this specification, referred to as "first spherical surface grinding"). By the first spherical surface grinding, the sphericity of the golf ball can be improved, and burrs produced by the support pin and the vent pin (neither shown) can be removed. Also, by performing the first spherical surface grinding after the grinding for trimming as described above, some of the land part of the golf ball can be prevented from being peeled off by the grinding performed while a portion around the burrs is pulled in the spherical surface grinding.

Figure 7A:
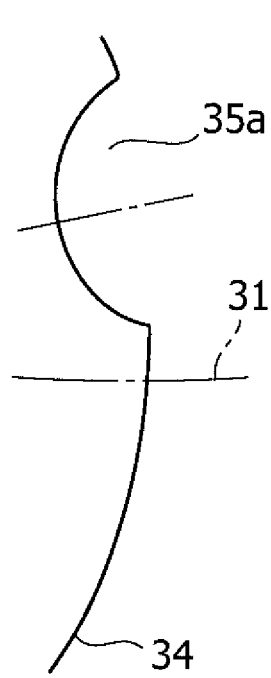
FIG. 7(A) is a sectional view showing a state after the golf ball shown in FIG. 5(B) has been subjected to first spherical surface grinding.

To remove the pin burrs sufficiently, the lower limit of the grinding amount of the first spherical surface grinding is set preferably at about 3 μm, and further preferably at about 5 μm. Also, to prevent the depth of a dimple from becoming too shallow and to restrain the influence on the ball outside diameter and the ball weight, the upper limit of the grinding amount is set preferably at about 20 μm, and further preferably at about 15 μm. FIG. 7(A) is an enlarged sectional view of the vicinity of the equator of the golf ball having been subjected to the first spherical surface grinding.

Figure 7B:
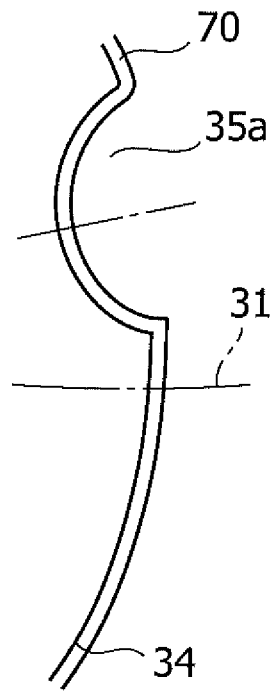
FIG. 7(B) is a sectional view showing a state after the golf ball shown in FIG. 7(A) has been color painted.

Next, the entirety of the golf ball is color painted. As shown in FIG. 7(B), a paint layer 70 is formed evenly on the entire surface of the land part 34 and the dimples 35. The color of the paint layer 70 is not subject to any special restriction if it is different from the color of the cover material. The color of the paint layer 70 can be chosen from, for example, white, black, red, blue, yellow, green, purple, orange, and brown. The paint and the painting method are not subject to any special restriction so long as they are ordinarily used for the color painting of the golf ball. As the paint, for example, a polyurethane resin paint or an epoxy resin paint can be used. As the painting method, for example, spray painting by using a spray gun and the like can be used.

The thickness of the paint layer 70 is not subject to any special restriction. However, the lower limit thereof is preferably about 12 μm, and further preferably about 14 μm. Also, the upper limit of paint thickness is preferably about 40 μm, and further preferably about 38 μm. It is preferable that the entire surface of the golf ball be subjected to surface treatment for roughening before being color painted. The surface treatment method is selected as appropriate depending on the kind of cover material. For example, immersion in active chlorine water, hydrochloric acid water containing metal hypochlorite, or sulfuric acid, irradiation by ultraviolet rays, flame treatment, or plasma treatment can be implemented.

Figure 7C:
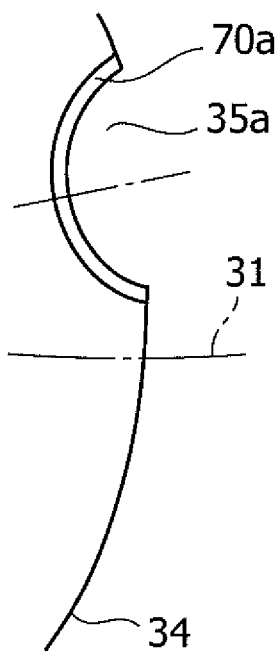
FIG. 7(C) is a sectional view showing a state after the golf ball shown in FIG. 7(B) has been subjected to second spherical surface grinding.

After the color painting, the entire spherical surface of the golf ball is ground (in this specification, referred to as "second spherical surface grinding"). As shown in FIG. 7(C), by the second surface grinding, paint layers 70a on the surfaces in the dimples 35 of the golf ball are left, and the paint layer on the surface of the land part 34 is removed. Therefore, since the cover material is exposed to the golf ball surface, the color of the land part 34 of the golf ball is the color of the cover material. The grinding amount of the second spherical surface grinding is preferably equal to or larger than the thickness of the paint layer 70. Excessive grinding exerts an influence on the dimple depth, ball outside diameter, and ball weight. Therefore, for example, the amount of grinding beyond the thickness of the paint layer 70 is preferably about 10 μm or less, and further preferably about 3 μm or less.

Figure 8:
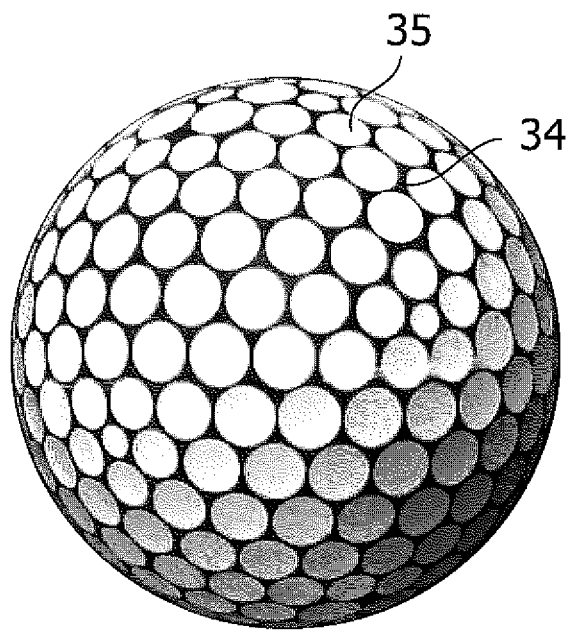
FIG. 8 is a front view showing one embodiment of a golf ball obtained by a method for manufacturing a golf ball in accordance with the present invention.
Figure 9:
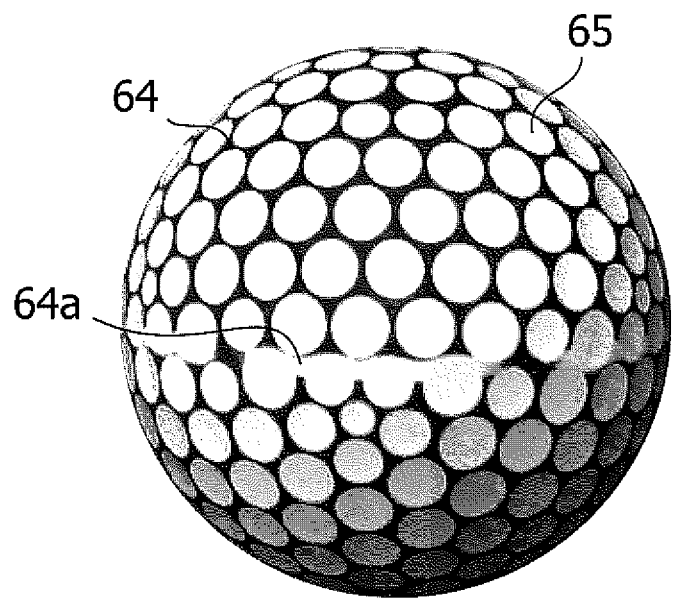
FIG. 9 is a front view showing one example of a golf ball obtained by a conventional method for manufacturing a golf ball.

FIG. 8 shows the entirety of the golf ball obtained as described above. As shown in FIG. 8, the dimples 35 assume a paint color (in this figure, a white color), and the land part 34 assumes a cover material color (in this figure, colorless), so that a golf ball having a clear color arrangement of two colors can be manufactured. For comparison, FIG. 9 shows the entirety of the golf ball manufactured by the conventional method in which a golf ball is formed by using the conventional mold, burrs on the parting line are ground, the entire surface of the golf ball is color painted, and thereafter the paint layer of the land part is removed by grinding. For the golf ball obtained by the conventional method, the dimples 35 assume a paint color, but portions 64a of the land part near the parting line of the land part 64 are scraped off at the same time when burrs are ground, and therefore the paint layer in these portions 64a is not removed by grinding, so that these portions 64a assume a paint color, not a cover material color.

FIG. 8 shows the golf ball on which the shapes of all dimples are circular. However, the shape of the dimple is not limited to this. All dimples may be formed so as to have a noncircular shape, or circular dimples and noncircular dimples may be present mixed on the golf ball. Also, the sizes and depths of all dimples may be equal, or dimples having a plurality of sizes or depths may be present mixed on the golf ball. For example, the diameters of dimples are preferably in the range of about 0.5 mm to about 6 mm, and the depths of dimples are preferably in the range of about 0.05 mm to about 0.4 mm.

A dimple occupation ratio, that is, a ratio of the total area of dimples, the dimple being defined by planar surface edge surrounded by the dimple edge, to the ball spherical surface area assuming that no dimples were present (an SR value) is preferably about 75% or higher. By making the SR value about 75% or higher, satisfactory aerodynamic performance can be achieved. Also, even in the case in which the color of cover material is dark, the visibility of the golf ball can be improved by making the paint color bright.

As the arrangement method for dimples, an arrangement method using a dimple pattern of a regular polyhedron, such as a regular octahedron, regular dodecahedron, or regular icosahedron, or an arrangement method of rotational symmetry in which the dimple pattern is rotated around the pole point, such as three symmetries, four symmetries, five symmetries, or six symmetries, can be used.

The embodiments of the golf ball and the method for manufacturing the golf ball in accordance with the present invention have been explained above. However, the present invention is not limited to the above-described embodiments, and all changes and modifications apparent to one skilled in the art are covered in the technical scope of the present invention.

DESCRIPTION OF SYMBOLS

1: Golf ball forming mold
2: Upper mold body part
3: Lower mold body part
4: Internal cavity
5: Parting line
6: Groove
7: Imaginary spherical surface
8: Groove bottom surface
9: Connecting surface
10: Cavity wall surface
11: Joint surface
12: Dimple forming protrusion
30A: Molded golf ball
30B: Ground golf ball
31, 61: Equator
32: Projecting land part for grinding
33: Connecting land part
34, 64: Land part
35, 65: Dimple
36: Cliff
70: Paint layer

What is claimed is:

1. A method for manufacturing a golf ball, comprising the steps of:
    forming the golf ball by using a mold, which mold includes at least two body parts, and is configured so that a cavity is formed within the mold by the joining of the at least two body parts, and in at least one of the body parts comprising:
    a plurality of protrusions for forming a plurality of dimples;
    a cavity wall surface for forming a land part of the golf ball; and
    a single groove for forming a projecting land part which is ground after the formation of the golf ball,
    wherein the single groove extends along the entire circumference of a parting line formed by the joining and has a bottom surface having a width between 0.2 and 10 mm and an opening having a width between 0.2 and 10 mm, and
    wherein the single groove has a cliff portion projected from an edge of the groove, the single groove being adjacent to one of the dimple-forming protrusion through the cliff portion which has a height to be ground; and
    performing treatment in which the golf ball formed by using the mold is treated so that the color of the entire land part of the golf ball is different from the color of the dimples.

2. The method for manufacturing a golf ball according to claim 1, wherein the step of performing a treatment in which the golf ball formed by using the mold is treated comprises the steps of:
    grinding a parting line part of the golf ball formed by using the mold;
    performing first spherical surface grinding to grind the entire spherical surface of the golf ball the parting line part of which has been ground;
    color painting the entirety of the golf ball having been subjected to the first spherical surface grinding; and
    performing second spherical surface grinding to grind the entire spherical surface of the golf ball having been color painted.

3. The method for manufacturing a golf ball according to claim 1, wherein a groove in the mold has a depth of about 5 μm to about 100 μm from an imaginary spherical surface of the cavity.

4. The method for manufacturing a golf ball according to claim 1, wherein the bottom surface of the groove in the mold and the wall surface of the cavity are connected gradually to each other.

5. The method for manufacturing a golf ball according to claim 1, wherein the bottom surface of the groove in the mold includes a spherical surface portion having the same center with respect to the spherical surface shape of the wall surface of the cavity.

* * * * *